No. 12,580. REISSUED DEC. 18, 1906.

J. HAMM.

FLASK FOR MOLDING CONCRETE BLOCKS.

APPLICATION FILED JULY 14, 1906.

2 SHEETS—SHEET 1.

Witnesses.
Edward T. Wray.
J. S. Abbott

Inventor,
John Hamm
by Burton & Burton
his Attys.

No. 12,580. REISSUED DEC. 18, 1906.

J. HAMM.

FLASK FOR MOLDING CONCRETE BLOCKS.

APPLICATION FILED JULY 14, 1906.

2 SHEETS—SHEET 2.

Witnesses.
Edward T. Wray
J. S. Abbott

Inventor.
John Hamm
by Burton Burton
his Attys.

UNITED STATES PATENT OFFICE.

JOHN HAMM, OF MINNEAPOLIS, MINNESOTA, ASSIGNOR OF ONE-TENTH TO MIRACLE PRESSED STONE COMPANY, OF MINNEAPOLIS, MINNESOTA, A CORPORATION OF SOUTH DAKOTA.

FLASK FOR MOLDING CONCRETE BLOCKS.

No. 12,580. Specification of Reissued Letters Patent. Reissued Dec. 18, 1906.

Original No. 810,053, dated January 16, 1906. Application for reissue filed July 14, 1906. Serial No. 326,298.

*To all whom it may concern:*

Be it known that I, JOHN HAMM, a citizen of the United States, residing at Minneapolis, in the county of Hennepin and State of Minnesota, have invented new and useful Improvements in Flasks for Molding Concrete Blocks, of which the following is a specification, reference being had to the accompanying drawings, forming a part thereof.

My invention has for its object to provide an improved flask for use in molding concrete blocks and bricks; and to this end the invention consists of the novel devices and combinations of devices hereinafter described, and defined in the claims.

In the accompanying drawings, which illustrate the invention, like characters indicate like parts throughout the several views.

Figure 1:
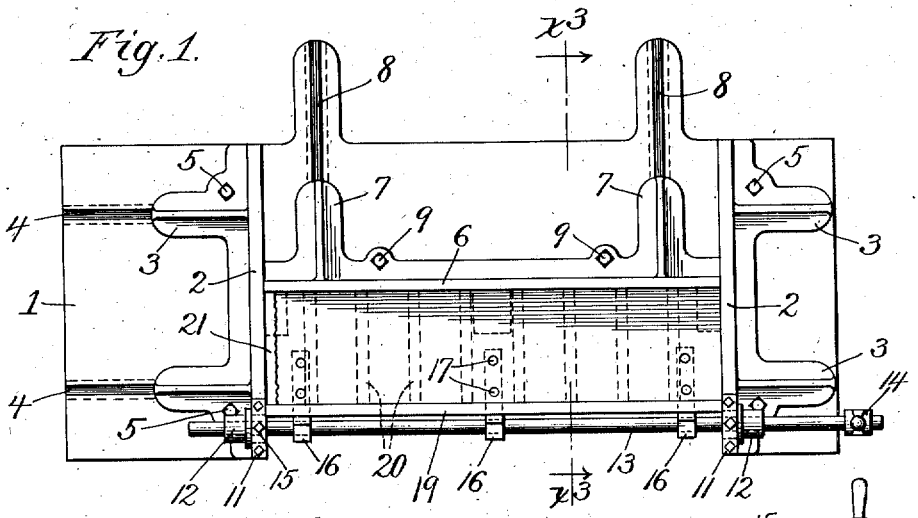
Figure 2:
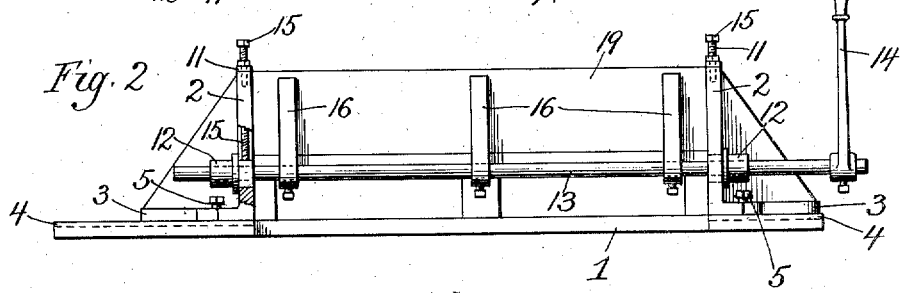
Figure 3:
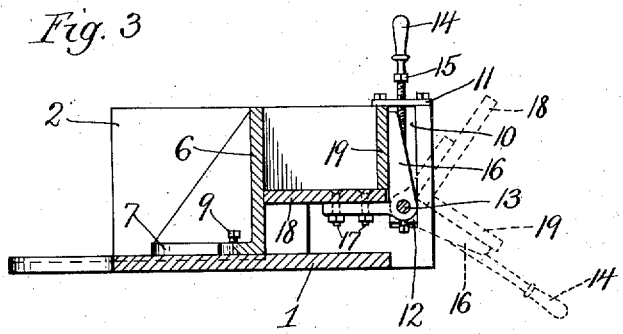
Figure 4:
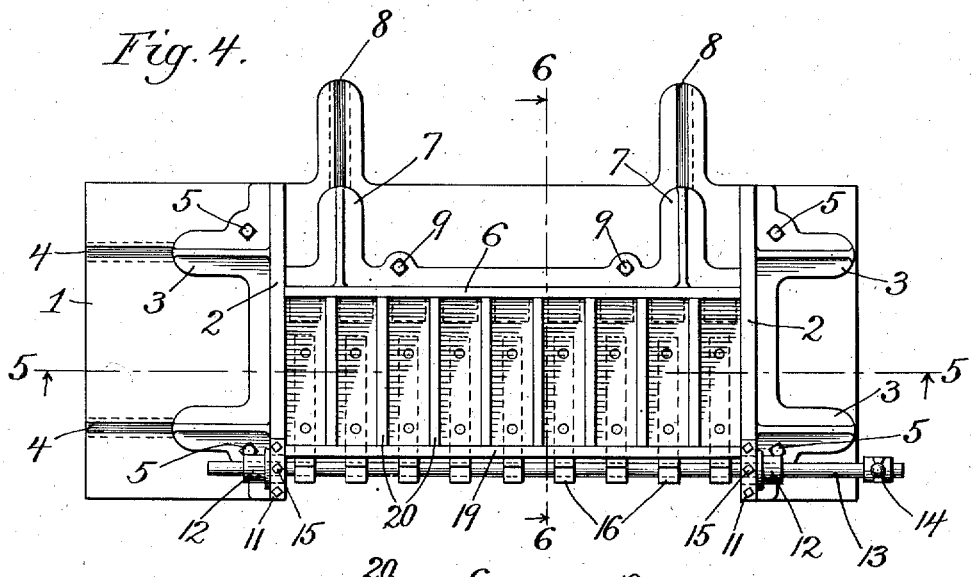
Figure 5:
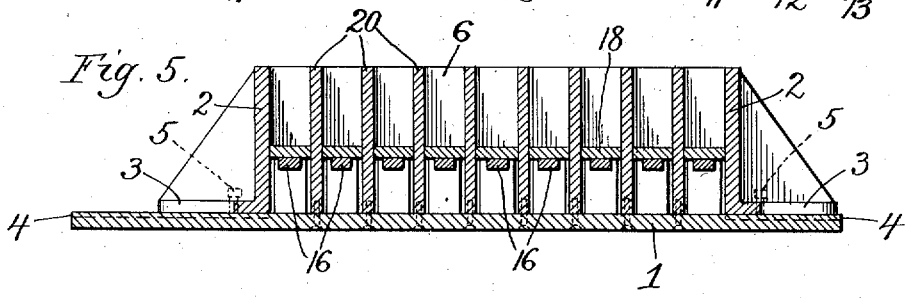
Figure 6:
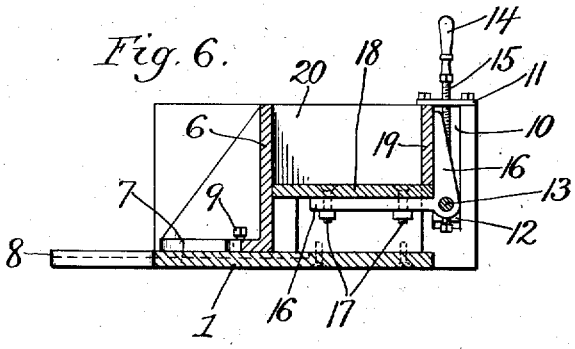

Figure 1 is a plan view showing the improved flask. Fig. 2 is a side elevation of the same. Fig. 3 is a transverse vertical section taken on the line $x^3$ $x^3$ of Fig. 1. Fig. 4 is a detail plan view showing a modification of the flask which is indicated in dotted line in Fig. 1 for making bricks or a plurality of small blocks. Fig. 5 is a section at the line 5 5 on Fig. 4. Fig. 6 is a section at the line 6 6 on Fig. 4.

The numeral 1 indicates a flat bed-plate upon which is mounted a pair of laterally-spaced vertically-disposed end plates 2, provided with foot-flanges 3, that have dovetailed engagement at 4 with said bed-plate and, as shown, are adapted to be rigidly held where set by set-screws 5, screwed through said flanges and impinging on said bed-plate. Extending at a right angle to and between the end plates 2 is a vertically-disposed laterally-adjustable side plate 6, having foot-flanges 7. These foot-flanges 7 have dovetailed engagement at 8 with the bed-plate, and set-screws 9 work through said flanges and impinge upon said bed-plate to securely hold side plate in whatever position it may be set. Near their forward edges the side plates 2 are formed with vertical slots 10, the tops of which are spanned by short tie-bars 11. Mounted for vertical movements in the slots 10 are bearing-boxes 12, in which is journaled a rock-shaft 13, having at one end an operating-lever 14. Adjusting-screws 15 work with threaded engagement through the tie-bars 11 and are swiveled at their lower ends one to each of the adjustable bearing-boxes 12. Rigidly secured to the rock-shaft 13 between the side plates 2 is a plurality of L-shaped levers 16, to the lower arm of which by means of short nutted bolts 17 is rigidly but detachably secured a plate 18, that forms the bottom of the flask. Loosely placed against the vertical arms of the levers 16 is a plate 19, that forms the removable side of the flask.

When the parts are adjusted as shown in the drawings by full lines, the flask is in condition to receive the plastic concrete which is to form the block. When the block has been formed, the lever 14 should be forced downward into a horizontal position, thereby turning the side plate 19 into a horizontal position and the bottom plate into a vertical position. This being done, the side plate 19, with the formed block, may be lifted off by the arms of the levers 16 and together may be carried away. For the next block another removable side plate 19 is of course placed in working position.

As is evident, the flask described is capable of adjustments to form blocks of different sizes. To vary the depth of the block, the bearing-boxes 12, together with the rock-shaft 13 and the bottom plate 18, are adjusted vertically by means of the screws 15, and such adjustments of course require the use of removable side plates 19 of different width. The width of the block may be varied by lateral adjustments of the side plate 6, and such adjustments of course require the use of bottom plates 18 of different widths. The length of the block may be varied by means of adjustments of one of the end plates 2 with respect to the other, and such adjustments, as is evident, require the use of plates 18 and 19 of different lengths.

To form bricks or a plurality of small blocks, vertical dividing plates 20 (indicated by dotted lines in Fig. 1) may be secured to the bed-plate 1 and arranged to work through slots in said bottom plate 18, and for this work narrow side boards 19 will usually be required. Such vertical dividing-plates 20 will be secured to the bed-plate in any good mechanical manner so as to be rigid therewith. The distance from the bed-plate 1, to which the dividing-plates will be secured, and the divided bottom plate through which the vertical dividing-plates 20 extend and by which they are positively held from tipping sideward renders such partition-plates sufficiently rigid in position when the mold is filled and tamped, and the fastening of the dividing-plates to the bed 1 will be sufficiently secure if it is such as to hold the plates erect when the mold is empty, so that their upper edges will enter accurately in the slots or apertures in the bottom plate 18.

When it is desired to form a block with a rough outer face, the removable side board 19 should have its inner face formed with indentations or roughened surface, which will give the proper or desired face to the block. Blocks which are to be used at the corner of a structure also require to have one end roughened or formed in imitation of stone, and to accomplish this result a thin loose end plate 21, having a roughened inner surface, is placed loosely against one of the end plates 2, as indicated in Fig. 1. This supplemental end plate when the movable parts of the flask are turned in the dotted-line position (indicated in Fig. 3) will either fall from working position or may be easily removed from the block.

The device described, while extremely simple and of small cost, may be operated with great rapidity and affords means for a large range of adjustment.

From what has been said it will be understood that the device described is capable of modification within the scope of my invention as herein set forth and claimed.

I claim—

1. In a device of the character described, the combination with end plates, 2, and a side plate, 6, of a rock-shaft mounted for vertical adjustments, and provided with a lever for rocking it, and a bottom plate and a side plate carried by said rock-shaft to and from operative position, substantially as described.

2. In a device of the character described, the combination with laterally-adjustable end and side plates, 2 and 6, respectively, of a vertical adjustable rock-shaft, 13, provided with an operative lever, 14, and with L-shaped levers, 16, and a bottom plate, 18, and a side plate, 19, supported by said levers, 16, and movable by said rock-shaft, to and from operative position, substantially as described.

3. The combination with a bed-plate, 1, of the end plates, 2, and side plate, 6, mounted for relative lateral adjustments on said bed-plate, vertically-adjustable bearings, 12, mounted in said end plates, a rock-shaft mounted in said bearings and provided with an operating-lever, 14, and with L-shaped levers, 16, and a bottom plate, 18, and side plate, 19, mounted on and carried by said levers, 16, substantially as described.

4. A flask for molding concrete blocks or bricks comprising a plurality of mold boxes or spaces each consisting of a movable and a stationary member, the stationary members of all said mold-boxes being formed by a continuous bar which constitutes one end of every mold-box, and parallel upright plates rigid with said bar constituting sides of said mold-boxes, the movable members of said mold-boxes being formed by a rock-shaft extending transversely with respect to said parallel upright plates; L-shaped levers rigidly mounted on said rock-shaft, and bottom plates for the several mold-boxes carried by corresponding arms of said levers respectively; a bar lodged against the other arms of the levers extending over all the mold-boxes to form one end of each, and means for rocking the shaft to carry the bottom plates up between the upright plates of the fixed member.

5. In a flask for molding concrete blocks or bricks, a partitioned mold-box which comprises a bottom element for each of the compartments separated by the partitions, all said bottom elements being rigidly united, and four upright walls encompassing the bottom elements and the partitions, such mold-box consisting of one fixed member and one movable member, the movable member comprising all the rigidly-united bottom elements and one of the upright walls which extends transversely with respect to said bottom elements and the partitions, the fixed member comprising the other three upright walls and the partitions, all rigidly united.

6. In a flask for molding concrete blocks or bricks, a partitioned mold-box which comprises a bottom element for each of the compartments separated by the partitions, all of said bottom elements being rigidly united, and four upright walls encompassing the bottom elements and the partitions, such mold-box consisting of a fixed member and a rocking member, the rocking member comprising all the rigidly-united bottom elements and one of the upright walls which extends transversely with respect to said bottom elements, the fixed member comprising the partitions and the three remaining upright walls, the movable member being mounted for rocking with respect to the fixed member about an axis at right angles to the partitions outside said transversely-extending upright wall and below the bottom.

7. A flask for molding concrete blocks and bricks and a rigid frame for supporting the same, the flask comprising a mold-box having partitions parallel with the two opposite sides dividing it into compartments and having a bottom element for each of the compartments separated by the partitions, all of said bottom elements being rigidly united, and four upright walls encompassing the bottom elements and the partitions; such mold-box consisting of one fixed member and one rocking member, the rocking member comprising all the rigidly-united bottom elements and one of the upright walls which extends transversely thereto, the fixed element comprising, rigidly united, the remaining three upright walls and the partitions, such partitions being supported and secured at their lower edges upon the rigid frame for rigidity with the remainder of said fixed member.

In testimony whereof I have hereunto set my hand, in the presence of two witnesses, at Minneapolis, Minnesota, this 28th day of June, 1906.

JOHN HAMM.

In presence of—
RAY TRAUTMAN,
A. M. MORSHARE.